Patented Nov. 5, 1935

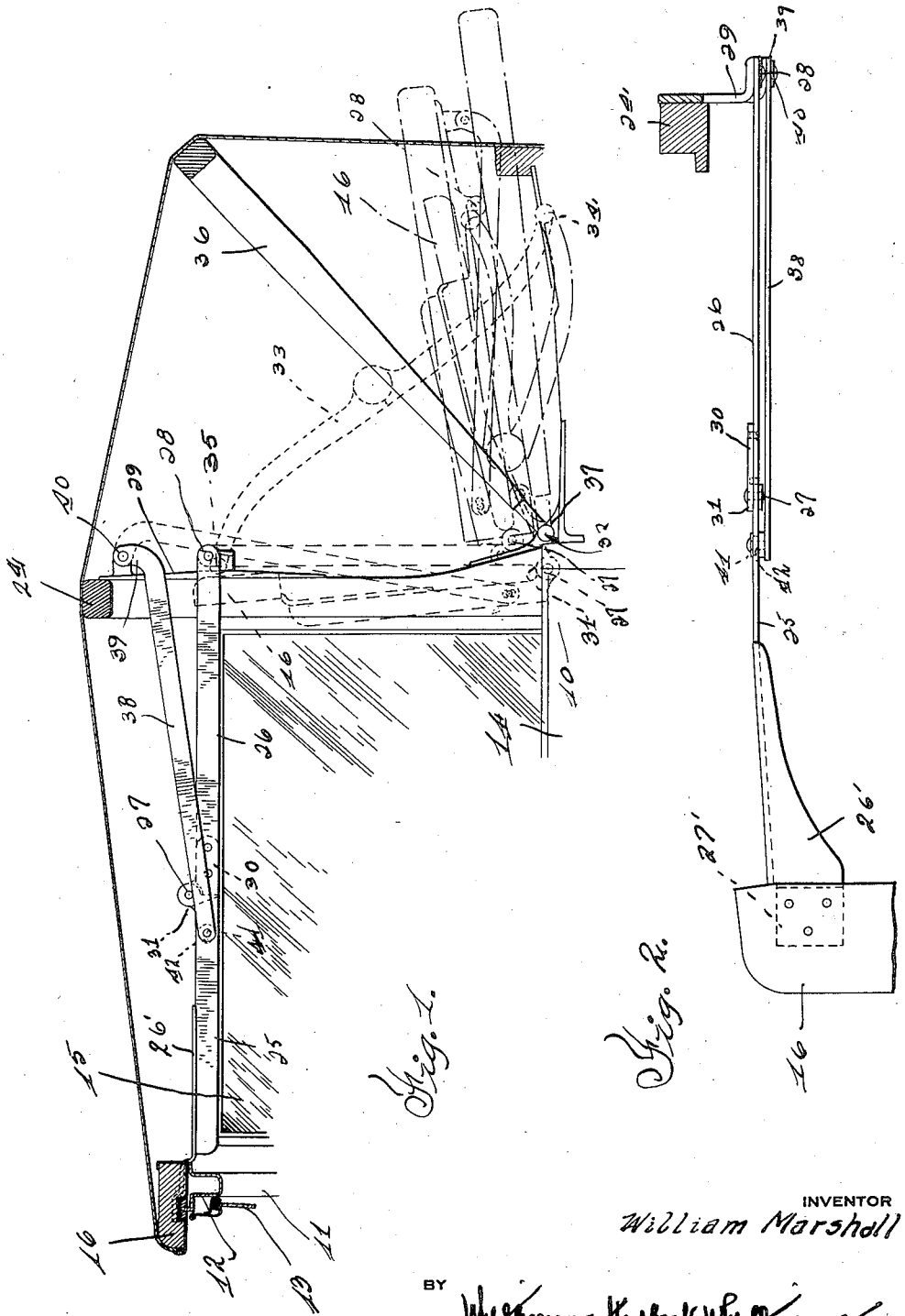

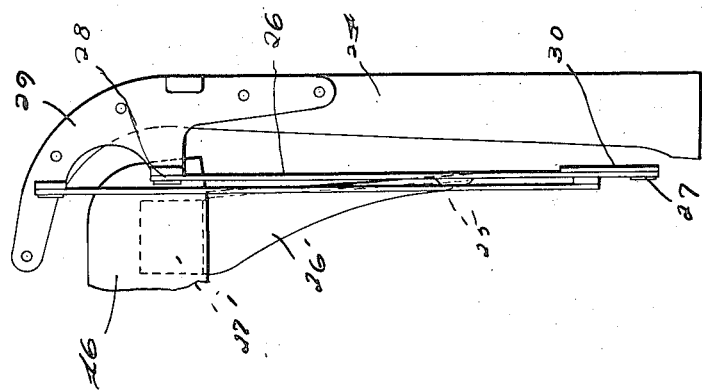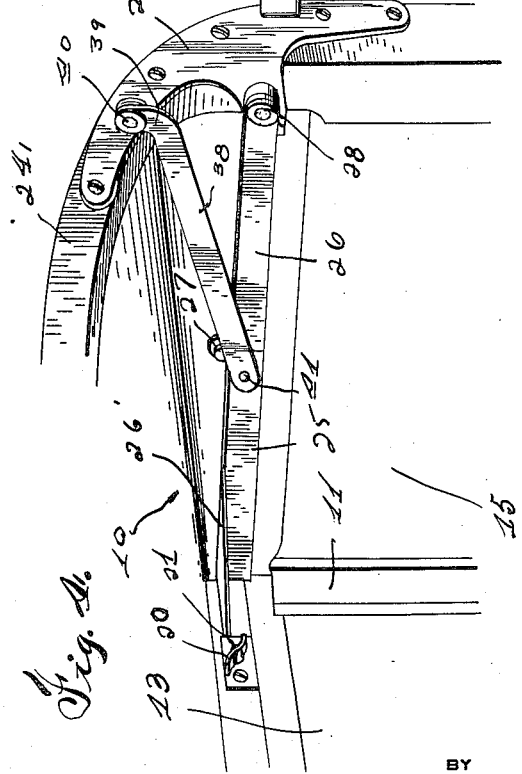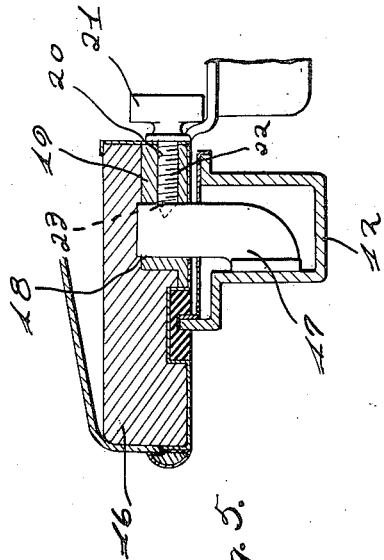

2,019,614

UNITED STATES PATENT OFFICE 2,019,614

VEHICLE BODY CONSTRUCTION

William Marshall, Detroit, Mich., assignor to Briggs Manufacturing Company, Detroit, Mich., a corporation of Michigan Application July 15, 1929, Serial No. 378,488

3 Claims. (Cl. 296—107)

This invention relates to vehicle bodies and has particular reference to improvements in the top constructions therefor.

The invention finds particular utility when used in connection with vehicle bodies of the closed car type, such for example as cabriolets and the like wherein the top and superstructure of the body are capable of being collapsed to permit the vehicle to assume the appearance of an open car.

An object of the present invention is to provide an improved collapsible top construction which when in its extended position forms a rigid assembly simulating in appearance a permanent top, and when in its collapsed position forms a neat and compact fold.

A further object of this invention is to provide a top of the above type which may be expeditiously manipulated and which is formed of a comparatively few number of parts permitting it to be economically manufactured, assembled and installed.

With the foregoing, as well as other objects in view, the invention resides in the peculiar construction of the top and the manner in which the same is folded to collapsed position.

In the drawings:

Figure 1 is a fragmentary sectional view through a vehicle body equipped with a top constructed in accordance with this invention.

Figure 2 is a sectional view taken on the line 2—2 of Figure 1.

Figure 3 is a detail view illustrating the position of the header when the top is moved to collapsed position.

Figure 4 is a detail perspective view of the construction shown in Figure 1; and Figure 5 is a detail sectional view showing the means for securing the top header upon the vehicle body.

Referring now to the drawings, it will be noted that there is illustrated fragmentarily in Figure 1 a vehicle body 10 having front upright stanchions 11 connected together at the upper ends thereof by means of a suitable channel-shaped header 12 which in turn forms a support for the conventional swinging windshield 13. Hingedly connected to the stanchions 11 are the usual doors 14 of the body, having window openings therein slidably receiving the glass panels 15 in the conventional manner.

Inasmuch as both sides of the top construction are substantially identical, only one side thereof will be specifically referred to herein.

The collapsible top for the body comprises a header 16 detachably mounted upon the header 12 and having a weatherproof engagement therewith substantially throughout the length thereof. The detachable connection between the two headers is accomplished by the mechanism illustrated in Figure 5 of the drawings. As shown, this mechanism comprises a bracket 17 secured in any suitable manner within the channel of the header 12 and projecting upwardly therefrom into engagement with an opening 18 formed in a fitting 19 carried by the header 16. The bracket 17 is normally maintained within the opening 18 by means of a thumb screw 20 having a finger engaging portion 21 conveniently accessible from the interior of the body and having a shank 22 threadedly mounted within the fitting and terminating in a tapered end portion 23 engageable within a correspondingly shaped opening formed in the bracket 17. The header 16 is connected to the main top supporting bow 24 by means of collapsible side rails comprising a pair of links 25 and 26 pivotally connected at the inner ends thereof as indicated at 27. In detail, the forward end of the link 25 is provided with a laterally extending web 26' which in turn is provided with an extension 27' extending within the header 16 and secured thereto. The rear end of the link 26, on the other hand, is pivotally connected as indicated at 28 to a bracket 29 which in turn is secured to the rear face of the bow 24. As shown particularly in Figures 1 and 2, the forward end of the lever 26 is pivotally connected to the rear end of the lever 25 through the intermediary of a plate 30 having a body portion secured to the link 26 and terminating at the forward end in an upwardly extending portion 31 which, as shown, is pivoted to a corresponding upwardly extending portion on the lever 25 by means of the pivot 27. The arrangement is such that when the links are in their extended position the pivot 27 assumes a position above the top edges of the links and in alignment with the abutting inner ends of the latter.

The bow 24 is substantially U-shaped and is hingedly connected to opposite sides of the body in rear of the doors 14 by means of suitable hinge members 32. As shown in Figure 1, the bow 24 normally assumes an upright position and is adapted to support the rear edges of the glass panels 15, when the top is in its extended position. The bow 24 is normally held in the position shown in Figure 1 by means of the conventional carriage brace 33 having the lower end thereof pivotally connected to the body as indicated at 34 and having the upper end thereof pivotally connected to the bracket 29 as indicated at 35. For supporting the portion of the top in rear of the bow 24, I provide a second bow 36 having the ends thereof pivotally connected to the body by means of the pintles 37 for the hinge members 32.

With the construction as thus far described and assuming that the top is in the position shown in Figure 1 and it is desired to collapse the same, the header 16 is merely detached from the header 12 by manipulating the thumb screws 20 and the inner pivoted ends of the links 25 and 26 are moved to the position illustrated by the dotted lines in Figure 1 wherein the header 16 and links 25 and 26 are shown as located within the boundary of the main top supporting bow 24. The side braces 33 are then broken to permit the bow 24, header 16 and connecting links 25 and 26 to move to the position shown by the dot and dash lines in Figure 1. The arrangement is such as to permit the header 16 and side links 25 and 26 to nestle within the boundaries of the main bow 24 when the top is completely collapsed so that these members will not affect the thickness of the top and as a consequence, permit the latter to be compactly collapsed. This construction is desirable as it not only gives a neat appearance to the vehicle when the top is collapsed, but also affords the occupants thereof a clear line of vision in rear of the vehicle.

For normally maintaining the links in the position illustrated in Figure 1, I provide a lever 38 terminating at the rear end thereof in an upwardly extending portion 39 pivotally connected as at 40 to the bracket 29 adjacent the upper end of the bow 24 substantially above the pivotal connection 28 between the rear end of the link 26 and the bracket. The forward end of the lever 38 carries a pin 41 slidably and pivotally engaging a slot 42 formed in the link 25 adjacent the rear end thereof and below the pivotal connection 27 between the inner ends of the links. The arrangement is such that when the top is in the full line position shown in Figure 1, the pin 41 carried by the lever 38 is engageable with the rear wall of the slot and the lever is under an initial tension. Thus, when considering that the lever 38 is pivoted at the forward end below the pivotal connection 27 and at the rear end above this latter connection, and is normally under an initial tension, it will be apparent that this lever will yieldably resist movement of the links 25 and 26 from the full line position shown in Figure 1.

What I claim as my invention is

1. A collapsible top for vehicle bodies comprising, a header detachably connected to the vehicle body, a top supporting bow having vertical legs connected to the vehicle body, a pair of links pivotally interconnected for folding, the forward link being connected at its free end to said header, a pivotal connection between the free end of the rear link and said bow mounted on the rear face of the vertical leg of said bow, and an arm member pivotally connected at one end to the forward link below the point of pivotal connection of said links and pivotally connected at its other end to the rear face of said bow above the aforesaid pivotal connection mounted on said bow.

2. A collapsible top for cabriolet type vehicles comprising, a header detachably connected to the vehicle body, a substantially vertically extending top supporting bow connected to the vehicle body, a pair of links pivotally interconnected for folding, a connection between the free end of the forward link and said header, a bracket mounted on the rear face of said bow having a pivotal connection with the free end of the rear link, and an arm member pivotally connected at its forward end to the forward link below the point of pivotal connection of said links and pivotally connected at its rear end to said bracket, said links and arm member being foldable to a position substantially within the vertical plane of said bow to position said header within the boundaries of the bow, as and for the purpose set forth.

3. A collapsible top for cabriolet type vehicles comprising, a header detachably connected to the body of the vehicle, a substantially vertically extending top supporting bow connected to the vehicle body, a pair of links pivotally interconnected for folding, a connection between the free end of the forward link and the header, a pivotal connection between the free end of the rear link and the bow located rearwardly beyond the plane of the bow, and an arm pivotally connected at its forward end to the forwardmost link below the point of pivotal connection of said links and pivotally connected at its rear end to the bow at a point spaced above the pivotal connection aforesaid, said links and arm being foldable to a position substantially within the plane of the bow to position the header within the boundaries of the bow.

WILLIAM MARSHALL.